UNITED STATES PATENT OFFICE.

WELLER RODENBERGER, OF ST. LOUIS, MISSOURI, ASSIGNOR OF ONE-HALF TO JOSEPH D. DONOVAN, OF ST. LOUIS, MISSOURI.

WATERPROOF COMPOSITION.

1,283,913.
No Drawing.

Specification of Letters Patent.
Application filed February 16, 1918. Serial No. 217,536.

Patented Nov. 5, 1918.

*To all whom it may concern:*

Be it kown that I, WELLER RODENBERGER, a citizen of the United States, residing at the city of St. Louis and State of Missouri, have invented a new and useful Waterproof Composition, of which the following is a specification.

This invention relates to a water proof composition.

An object of the invention is to produce an improved water proof composition adapted to be applied to any fabric, leather or the like, to render the same impervious to water without interfering with the flexibility thereof.

My improved water proof composition includes as ingredients proper proportions of white lead, linseed oil, turpentine, coal tar, paraffin, corn starch and poppy oil. These ingredients are thoroughly mixed together in the desired proportions to provide a liquid composition which can be applied to any fabric, leather or similar material and which will render the same impervious to moisture without interfering with the flexibility thereof. The composition when applied is perfectly flexible and durable and will not break or exfoliate even under widely varying temperatures, or when the material to which it is applied is bent, folded or crushed.

The composition may be given any desired color by the use of lead pigments of different colors, or by the addition to the mixture of other pigments of the color desired.

I do not confine myself to the use of the specific ingredients but contemplate the use of their equivalents and, without restricting myself to unessential details, what I claim and desire to secure by Letters Patent, is:—

1. A water proof composition comprising white lead, linseed oil, turpentine, coal tar, paraffin, corn starch and poppy oil.

2. A water proof composition comprising white lead, linseed oil, coal tar, paraffin, turpentine, corn starch, poppy oil, and a coloring matter.

3. A water proof composition comprising white lead, coal tar, turpentine, paraffin, corn starch and a vegetable oil.

WELLER RODENBERGER.